US012583183B2

(12) United States Patent
Suto et al.

(10) Patent No.: US 12,583,183 B2
(45) Date of Patent: Mar. 24, 2026

(54) IMPLANTED 3D PRINTING QUALITY ASSURANCE CONTROL

(71) Applicant: INTERNATIONAL BUSINESS MACHINES CORPORATION, Armonk, NY (US)

(72) Inventors: Tiberiu Suto, Franklin, NY (US); Jessica Nahulan, Markham (CA); Carolina Garcia Delgado, Zapopan (MX); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 18/180,435

(22) Filed: Mar. 8, 2023

(65) Prior Publication Data

US 2024/0300183 A1 Sep. 12, 2024

(51) Int. Cl.
| | |
|---|---|
| *B29C 64/393* | (2017.01) |
| *B33Y 50/02* | (2015.01) |
| *H04L 9/08* | (2006.01) |
| *H04L 9/32* | (2006.01) |

(52) U.S. Cl.
CPC ............ *B29C 64/393* (2017.08); *B33Y 50/02* (2014.12); *H04L 9/0825* (2013.01); *H04L 9/3239* (2013.01)

(58) Field of Classification Search
CPC ...................................................... B29C 64/393
See application file for complete search history.

(56) References Cited

U.S. PATENT DOCUMENTS

| | | | |
|---|---|---|---|
| 8,526,026 B2 | 9/2013 | Kato | |
| 9,076,083 B1 | 7/2015 | Person | |
| 10,265,911 B1 | 4/2019 | Capri | |
| 2015/0045928 A1 | 2/2015 | Perez | |
| 2015/0165683 A1* | 6/2015 | Cheverton | ............ B29C 64/112 |
| | | | 382/141 |
| 2015/0177158 A1 | 6/2015 | Cheverton | |
| 2017/0057170 A1 | 3/2017 | Gupta | |
| 2018/0046167 A1* | 2/2018 | Iverson | .............. G05B 19/4099 |
| 2018/0059644 A1 | 3/2018 | Lection | |
| 2018/0113437 A1 | 4/2018 | Mummidi | |
| 2018/0178451 A1* | 6/2018 | Gosch | .................... B33Y 30/00 |
| 2018/0257306 A1* | 9/2018 | Mattingly | .............. B33Y 50/00 |

(Continued)

FOREIGN PATENT DOCUMENTS

| | | | | |
|---|---|---|---|---|
| CN | 114474742 A | 5/2022 | | |
| WO | WO-2022159344 A1 * | 7/2022 | ............. | B33Y 50/02 |

OTHER PUBLICATIONS

Beamler, "Printability Check", Beamler.com, May 5, 2018, [accessed Dec. 1, 2022], 9 pgs., Retrieved from the Internet: >https://www.beamler.com/printability-check/>.

(Continued)

*Primary Examiner* — Suresh Suryawanshi
(74) *Attorney, Agent, or Firm* — Elliot J. Shine

(57) ABSTRACT

A method, computer system, and a computer program product for quality control in 3D printing is provided. The present invention may include receiving a print job for a 3D printer, wherein the print job includes a digital model. The present invention may include monitoring the printing process of the digital model. The present invention may include identifying one or more deviations in the printing process.

20 Claims, 3 Drawing Sheets

200

(56) References Cited

U.S. PATENT DOCUMENTS

| 2018/0297113 | A1 |   | 10/2018 | Preston |   |
| 2020/0324483 | A1 | * | 10/2020 | Chambers | G01N 29/346 |
| 2021/0283717 | A1 | * | 9/2021 | Iyer | B33Y 10/00 |
| 2022/0398335 | A1 | * | 12/2022 | Lajeunesse | G06F 21/10 |

OTHER PUBLICATIONS

Marketwatch, "3D 4D Technology Market Projected to Hit US$8406.0 Billion By 2030," Marketwatch.com, Alliance News via COMTEX, Oct. 21, 2022, [accessed Jan. 4, 2023], 6 pgs., Retrieved from the Internet: <https://www.marketwatch.com/press-release/3d-4d-technology-market-projected-to-hit-US-84060-billion-by-2030-2022-10-21>.

Peterson, "Shifting transport paradigms, 3D printing in the transportation industry", IBM.com, [accessed Jan. 2, 2023], 6 pgs., Retrieved from the Internet: <https://www.ibm.com/thought-leadership/institute-business-value/en-us/report/3d-printing>.

* cited by examiner

100

IMPLANTED 3D PRINTING QUALITY ASSURANCE CONTROL

BACKGROUND

The present invention relates generally to the field of computing, and more particularly to quality control in Three-Dimensional (3D) printing.

Three-Dimensional (3D) printing, also known as Additive Manufacturing, may enable the construction of a three-dimensional object from a computer-aided design (CAD) model and/or a digital 3D model (e.g., print model). 3D printing may refer to a variety of processes in which material may be deposited, joined, or solidified under computer control to create a three-dimensional object. 3D printing may be limited to materials such as, but not limited to, metals or plastics, which may allow for sufficient temperature control to allow for 3D printing. Although three-dimensional (3D) printing has become increasingly popular, many 3D printers may still suffer from failures. The failure rate of 3D prints may be caused by numerous factors, such as, but not limited to, running out of filament, nozzle locations relative to a print-bed, restricted print chambers, and/or faulty print models. There are many factors which may determine a model's printability, including, model wall thickness, orientation, strength, model density, amongst other factors. Additionally, 3D printing parts may be produced layer-by-layer, and although these layers may adhere together it may also allow for the layers to delaminate under certain stresses, orientations, and/or conditions. The current state of the art fails to disclose an ability to perform a quality control validation at each level of a print nor does it disclose a method for deriving uniqueness of an item and/or print job.

Accordingly, a system is needed by which a 3D print may be consistently monitored with the ability to perform a quality control validation at each level of a print in order to ensure quality assurance layer by layer during the print by identifying derived progress through any possible delta deviations against the print model. Furthermore, a method of verifying authenticity and enforcing print restrictions on particular items is needed in the 3D printing space.

SUMMARY

Embodiments of the present invention disclose a method, computer system, and a computer program product for quality control in 3D printing. The present invention may include receiving a print job for a 3D printer, wherein the print job includes a digital model. The present invention may include monitoring the printing process of the digital model. The present invention may include identifying one or more deviations in the printing process.

In another embodiment, the method may include presenting a user with a plurality of previous deviations previously identified in a user interface, classifying the plurality of previous deviations based on feedback received from the user within the user interface, storing the classifications of the plurality of previous deviations in a personal knowledge corpus, and training a machine learning model to determine if a deviation puts the quality acceptance criteria of the user at risk based on the classifications stored in the personal knowledge corpus.

In another embodiment, the method may include authenticating the 3D printer based on printing restrictions included within the print job, the print restrictions including a number of total permitted prints for the digital model.

In a further embodiment, the method may include generating a print request message, signing the print request message using a private key associated with the 3D printer and generating a first hash corresponding to the print message request, sending the print request message to a 3D model provider and generating a second hash for the print request message received by the 3D model provider, wherein the second hash matches the first hash, and encrypting a file containing the digital model with the second hash using symmetric encryption.

In yet another embodiment, the method may include receiving video from one or more Internet of Things (IoT) devices associated with the 3D printer, generating a print model based on an analysis of the video received from the one or more IoT devices, and comparing the print model with the digital model.

The present invention may also include monitoring a printing process of a digital model using video received from one or more IoT devices associated with a 3D printer, generating a machine-readable code based on a real-time text file, and embedding the machine-readable code in the video received from the one or more IoT devices.

In addition to a method, additional embodiments are directed to a computer system and a computer program product for monitoring the printing process of a digital model in order to ensure authenticity and identify deviations during a printing process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
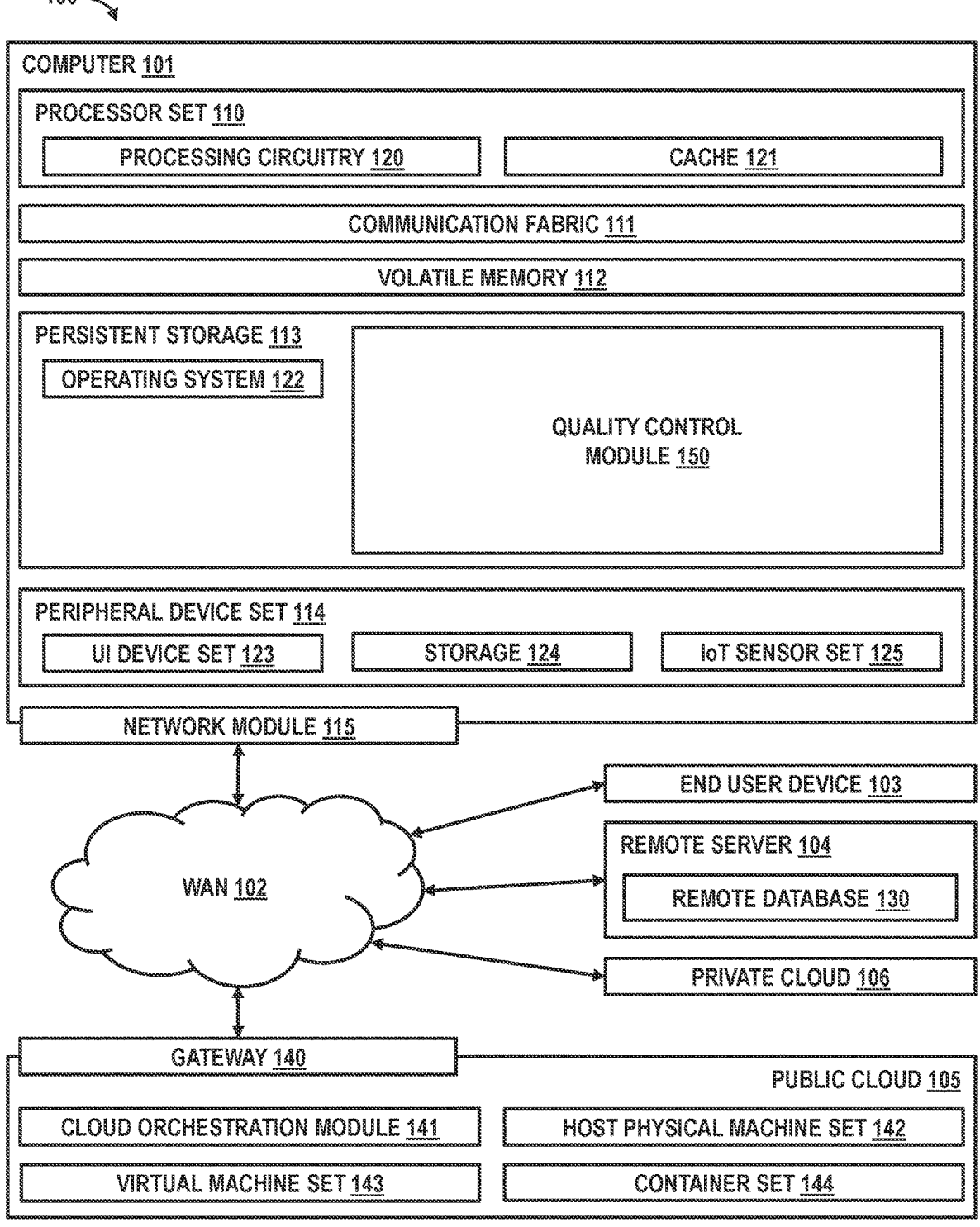
FIG. 1 depicts a block diagram of an exemplary computing environment according to at least one embodiment.

The following described exemplary embodiments provide a system, method and program product for quality control and authenticity verification in 3D printing. As such, the present embodiment has the capacity to improve the technical field of 3D printing by monitoring the printing process of a digital model in order to ensure authenticity and identify deviations during a printing process. More specifically, the present invention may include receiving a print job for a 3D printer, wherein the print job includes a digital model. The present invention may include monitoring the printing process of the digital model. The present invention may include identifying one or more deviations in the printing process.

As described previously, Three-Dimensional (3D) printing, also known as Additive Manufacturing, may enable the construction of a three-dimensional object from a computer-aided design (CAD) model and/or a digital 3D model (e.g., print model). 3D printing may refer to a variety of processes in which material may be deposited, joined, or solidified under computer control to create a three-dimensional object. 3D printing may be limited to materials such as, but not limited to, metals or plastics, which may allow for sufficient temperature control to allow for 3D printing. Although three-dimensional (3D) printing has become increasingly popular, many 3D printers may still suffer from failures. The failure rate of 3D prints may be caused by numerous factors, such as, but not limited to, running out of filament, nozzle locations relative to a print-bed, restricted print chambers, and/or faulty print models. There are many factors which may determine a model's printability, including, model wall thickness, orientation, strength, model density, amongst other factors. Additionally, 3D printing parts may be produced layer-by-layer, and although these layers may adhere together it may also allow for the layers to delaminate under certain stresses, orientations, and/or conditions. The current state of the art fails to disclose an ability to perform a quality control validation at each level of a print nor does it disclose a method for deriving uniqueness of an item and/or print job.

Accordingly, a system is needed by which a 3D print may be consistently monitored with the ability to perform a quality control validation at each level of a print in order to ensure quality assurance layer by layer during the print by identifying derived progress through any possible delta deviations against the print model. Furthermore, a method of verifying authenticity and enforcing print restrictions on particular items is needed in the 3D printing space.

Therefore, it may be advantageous to, among other things, receive a print job for a 3D printer, wherein the print job includes a digital model, monitor a printing process of the digital model, and identify one or more deviations in the printing process.

According to at least one embodiment, the present invention may improve quality control in 3D printing my monitoring the printing process and identifying deviations in the printing process based on a comparison between the 3D print model (e.g., print model) and the digital model (e.g., 3D model) described at step 206 and/or one or more additional validation methods. The one or more additional validation methods may include, but are not limited to including, photoelectric sensors tests, ultrasonic sound validation tests, quality acceptance evaluations, defect classification assessment, correctability assessments, amongst other validation methods. The one or more additional methods being employed using at least light sensors, ultrasonic capable microphones, and/or cameras associated with one or more IoT devices within the printing chamber of the 3D printer.

According to at least one embodiment, the present invention may improve quality control in 3D printing by either halting printing and/or alerting a user based on a quality acceptance criteria. The quality acceptance criteria being determined based on one or more of, printing preferences included in a print job, quality acceptance criteria of a crowdsourced knowledge corpus, and/or a quality acceptance percentage assigned by a machine learning model trained based on user feedback. This may also save materials, time, and enable the proactive abandonment of a print job.

According to at least one embodiment, the present invention may improve authentication verifications of print models by monitoring a printing process of digital model using video received from one or more IoT devices associated with a 3D printer, generating a machine-readable code based on a real-time text file, and embedding the machine-readable code in the video received from the one or more IoT devices. The real-time text file containing information such as, but not limited to, printer manufacturer, 3D printer model, 3D printer serial number, hash1 (e.g., SHA-2 hash corresponding to the message request), unique identifiers (UIDs) for the IoT devices and/or cameras, amongst other information. In some embodiments an additional SHA-2 hash of the video pixels in the previous time frame of the video frame (e.g., hash3) and the time into print may also be included in the real-time text file.

According to at least one embodiment, the present invention may improve authentication verifications of print models by continuously signing the real-time text file with the private key of the 3D printer and utilizing the signature fingerprint in generating the machine-readable code, the machine-readable code being added to the video of the printing process or embedded in the metadata. The authentication may be further enhanced by continuously signing the real-time text file in pre-determined time increments, such as every second, and/or sign according to different stages of the printing process, such as a number of times for each layer and/or signing anytime the printing material is changed. Accordingly, the real-time text file is signed continuously with the private key of the 3D printer and the signature fingerprint is used to generate the machine-readable code, such as a QR code, which may be embedded in the video displayed to a user (e.g., client) in real time in a user interface.

Referring to FIG. 1, Computing environment 100 contains an example of an environment for the execution of at least some of the computer code involved in performing the inventive methods, such as monitoring the printing process of a digital model in order to ensure authenticity and identify deviations during a printing process using quality control module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the computer environment 100 may use the quality control module 150 to monitor the printing process of a digital model (e.g., 3D model) in order to ensure authenticity and identify deviations during a printing process. The 3D printer quality control method is explained in more detail below with respect to FIGS. 2 and 3.

Figure 2:
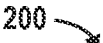
FIG. 2 is an operational flowchart illustrating a process for quality control in 3D printing according to at least one embodiment.
Figure 2:
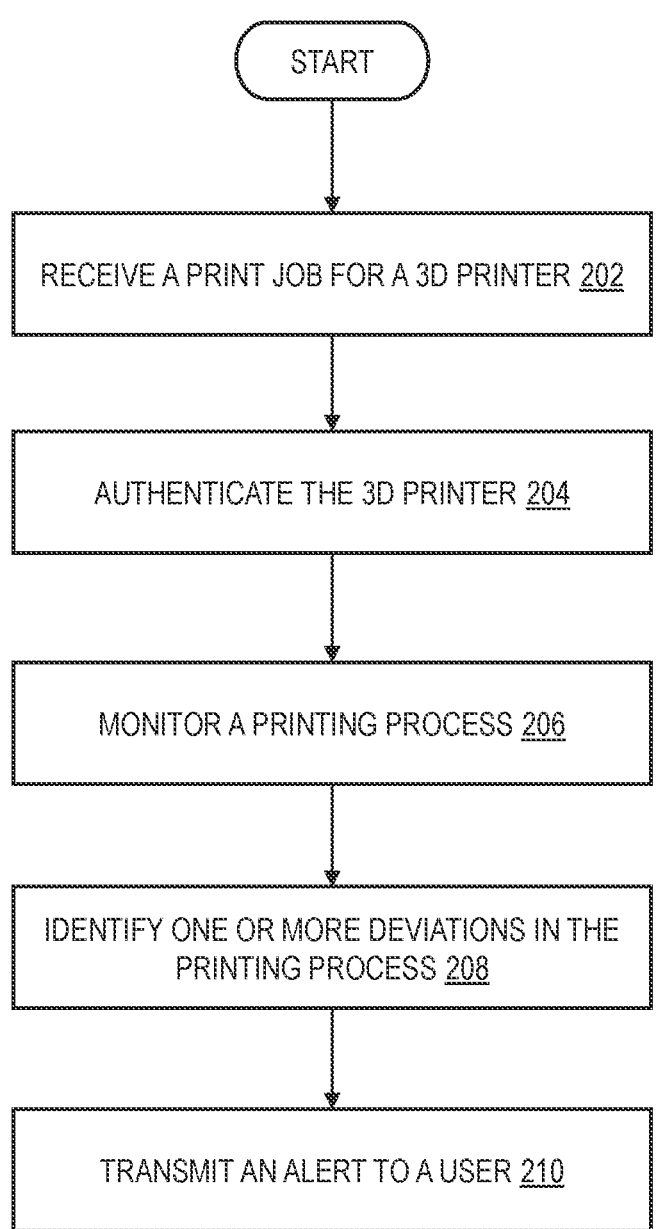

Referring now to FIG. 2, an operational flowchart illustrating the exemplary 3D printer quality control process 200 used by the quality control module 150 according to at least one embodiment is depicted.

At 202, the quality control module 150 receives a print job for a three-dimensional (3D) printer. The print job may include, but is not limited to including, an opt-in from the user (e.g., client), manufacturer, 3D model provider, a digital model (e.g., 3D model), printing preferences, and/or printing restrictions.

The digital model (e.g., 3D model) may be in one or more different file formats, such as, but not limited to, stereolithography file format (STL), Additive Manufacturing File format (AMF), Virtual Reality Modeling Language (VRML), OBJ file format, Polygon File Format (PLY), G-code format, amongst other formats. The 3D model provider may be a third-party employed by the user (e.g., client) to generate the digital model (e.g., 3D model). The user (e.g., client) may also act as the 3D model provider in situations where a third-party is not required in generating a digital model (e.g., 3D model). For example, the user (e.g., client) may have sent the 3D model provider an object such as a necklace the user (e.g., client) intends on producing using a 3D printer. The 3D model provider may utilize a computer-aided design (CAD) package, such as, but not limited to, a 3D scanner and/or camera using photogrammetry software in creating a digital model (e.g., 3D model) based on the necklace. The 3D model provider may send the digital model (e.g., 3D model) to a manufacturer, the manufacturer being the entity with the 3D printer which will be used in producing the 3D prints of the necklace. The opt-in from the user (e.g., client), manufacturer, and 3D model provider will be described in more detail below, but the opt-in generally refers to the assigning of public and/or private keys for verification to all parties associated with the print.

The printing preferences may include, but are not limited to including, specifications of a 3D printer, materials to be used, structural strength requirements, 3D printer authentication preferences, quality acceptance criteria, amongst other printing preferences which may be determined between the user (e.g., client) and/or manufacturer in accordance with an intended use of the printed object. As will be explained in more detail below with respect to printing restrictions, 3D printer authentication may be required for print jobs with specific printing restrictions and/or print jobs in which the user (e.g., client) may request printer authentication in the printing preferences. As will be explained in more detail below, the quality acceptance criteria may be determined by the user (e.g., client) and/or automatically determined by the quality control module 150 using the acceptability criteria of the crowdsourced knowledge corpus (e.g., database 130) and/or additional information included in the print job. The user (e.g., client) may specify the quality acceptance criteria as a specific percentage of quality expected from output as compared to the digital model (e.g., 3D model).

Specifications of the 3D printer may include, but are not limited to including, print chamber dimensions, 3D printer make and model, nozzle dimensions, nozzle materials, amongst other specifications. The print chamber dimensions may refer to space available for a 3D printer to print the digital model, wherein the width and length dimensions may be the surface area of a print bed. The print bed may be the part of the 3D printer in which the 3D printed object rests during the printing process. As will be described in more detail below with respect to step 206 and FIG. 3, the 3D printer utilized by the manufacturer in performing the print job may be equipped with at least one or more IoT (Internet of Things) devices. The one or more IoT devices may each be connected to (e.g., equipped with) with at least one or more cameras, wherein the one or more cameras may cover different zones of the layers being produced during the printing process. In some embodiments, the one or more IoT devices may each be mounted on a movable platform and the cameras associated with the IoT devices may have the ability to pan, tilt, and/or zoom in order to narrow in on a particular area for quality checking from various angles and/or zoom levels. The one or more IoT devices may also be connected to (e.g., equipped with) light sensors and/or an ultrasonic capable microphone amongst other sensors.

As will be explained in more detail below, in addition to the printing preferences the quality control module 150 may also utilize a crowdsourced knowledge corpus (e.g., database 130) in identifying one or more deviations within a print process, step 208, and determining whether to transmit an alert to the user, step 210. The crowdsourced knowledge corpus (e.g., database 130) may be utilized by the quality control module in at least automating acceptability criteria of the item and/or object being printed based on quality acceptance percentage for certain categories of items. The user (e.g., client) may be able to override the acceptability criteria of the crowdsourced knowledge corpus (e.g., database 130). For example, the quality acceptance percentage for a medical item to be used commercially may be greater than the quality acceptance percentage for a tool to be used by the user (e.g., client) in their home garage. The quality control module 150 may also utilize additional details in addition to the acceptability criteria of the crowdsourced knowledge corpus (e.g., database 130) such as the materials to be used and/or the structural strength requirements within the printing preferences in determining the quality acceptance criteria.

The printing restrictions may include numbers of prints permitted total, number of prints permitted in each material, and/or other printing restrictions which may be specified by the user (e.g., client). The quality control module 150 may hold the print job based on the printing restrictions until the 3D printer may be authenticated, the authentication process will be described in more detail below with respect to step 204. For example, the digital model (e.g., 3D model) may be a non-fungible token (NFT) representing a unique piece of art with a mint of 1 in which the user (e.g., client) is the sole owner. The quality control module 150 may authenticate the user (e.g., client) as the sole owner by requiring the user (e.g., client) to connect a digital wallet and authorize a transaction. Accordingly, the quality control module 150 will ensure only one item representing the NFT is printed. Additionally, the quality control module 150 may require a transaction on the blockchain associated with the NFT enabling the public to see that the associated NFT has been produced in physical form. Another example of printing restrictions may include limitations as to the types of material to be used. The user (e.g., client) may create a digital model (e.g., 3D model) of a necklace in which the user (e.g., client) wishes to create 50 physical necklaces. The user (e.g., client) may include in the print restrictions that 5 of the necklaces are to be produced in gold, 15 in silver, and the remaining 30 in metal. The user (e.g., client) may also set different quality acceptance criteria for each of the three different materials such that the quality acceptance criteria for the gold necklaces may be higher than the silver necklaces and the quality acceptance criteria of the silver necklaces may be higher than the metal necklaces.

The quality control module 150 may also perform a pre-check for the printability of the digital model (e.g., 3D model) in advance and/or prior to the initiation of the printing process in order to analyze the digital model (e.g., 3D model) and locate one or more points of risk at risk for failure in a to-be printed digital model (e.g., 3D model). The one or more points of risks collected before the print by the quality control module may be stored in the database 130 and retrieved during the printing process by the quality control module 150. The one or more points of risk may require heightened scrutiny during the monitoring of the printing process at step 206. For example, if the video analysis is running on a fixed update cycle, then during the one or more points of risk, the video footage analysis may switch to a higher frame rate. The quality control module 150 may also transmit an alert and/or pre-check summary to the user (e.g., client) detailing the one or more points of risk to the user (e.g., client) and/or one or more recommendations. The one or more recommendations may include different materials which may be substituted for improved structural requirements and/or s different 3D printer model with more ideal printing chamber dimensions. The quality control module 150 may transmit the alert to an authorized device of the user using email, text, and/or other messaging services and/or within a user interface displayed by the quality control module 150 in at least an internet browser, dedicated software application, and/or as an integration with a third party software application. The user (e.g., client) may also be able to monitor the printing process within the user interface and/or control the printing process in response to alerts received based on identified deviations within the printing process.

At 204, the quality control module 150 authenticates the 3D printer. The quality control module 150 may authenticate the 3D printer based on the printing preferences and/or printing restrictions included within the print job.

The quality control module 150 may authenticate the 3D printer by utilizing the 3D printer to generate a print request message. The print request message may include, but is not limited to including, the printer manufacturer, printer model, printer serial number, data and time of the request, the 3D printer's public key, and/or the file name of the digital model (e.g., 3D model). The quality control module 150 may sign the print request message using the 3D printer's private key and then encrypted with the 3D model provider's public key prior to being transmitted to the 3D model provider. The quality control module may store a SHA-2 hash corresponding to the message request (e.g., hash1) in a secure area of the 3D printer's memory and/or in database 130.

Upon receiving the print request message, the 3D model provider may also generate a SHA-2 hash of the message received (e.g., hash2). The hash2 generated by the 3D model provider should match the hash1 saved to the secure area of the 3D printer's memory. The quality control module 150 may further verify with the printer manufacturer that the model and the serial numbers provided correspond to a 3D printer produced by the manufacturer and support the secure printing protocols defined within the printing restrictions of the print job. The further verification may be performed using an application programming interface (API) call within the printer manufacturer software. The cryptographic check of the 3D printer's private key signature generated above may be utilized as authentication proof that only the 3D printer specified for the print job may have generated the signature.

The 3D model provider may utilize the quality control module 150 to encrypt the file of the digital model (e.g., 3D model) with the hash2. The quality control module 150 may utilize symmetric encryption and then further encrypt the resulting message with the 3D printer's public key prior to sending back to the 3D printer. The quality control module 150 may decrypt the message received by the 3D printer from the 3D model provider using the 3D printer's private key and then further decrypt the next layer of symmetric encryption using hash1 stored in the secure area of the 3D printer's memory and/or database 130.

At 206, the quality control module 150 monitors a printing process. The quality control module 150 may monitor the printing process for the print job received at step 202 using video received from the one or more IoT devices associated with the 3D printer.

The quality control module 150 may utilize the video received from the one or more IoT devices associated with the 3D printer in performing a comparison between the video received and the digital model (e.g., 3D model). The quality control module 150 may generate a 3D print model (e.g., print model) based on an analysis of the video received from the IoT devices and utilize the 3D print model (e.g., print model) in performing the comparison with the digital model (e.g., 3D model) such that the quality control module may detect any differences and/or discrepancies between the two models.

In addition to monitoring for differences and/or discrepancies between the outcome, 3D print model (e.g., print model), and the expected outcome, digital model (e.g., 3D model), and trying to detect unwanted holes, cracks, bumps, amongst other imperfections, the quality control module 150 may also utilize the video received from the IoT devices in monitoring an x-y-z axis alignment of the 3D print model's (e.g., print model's) layers. As will be explained in more detail below with respect to steps 208 and 210, the quality control module 150 may halt the printing process if the 3D print model (e.g., print model) fails the delta monitoring of the quality control check. This may enable the user (e.g., client) to save on print materials and/or filament by detecting a faulty print earlier as opposed to post print completion.

In an embodiment, the quality control module 150 may add a machine-readable code, such as, but not limited to, a QR code, RFID (radio frequency identification) codes, a barcode, data matrix codes, matrix barcodes, amongst other existing and/or later-developed machine-readable optical labels to the video footage frame and/or embedded in the metadata. The machine-readable code may be based on a real-time text file containing information such as, but not limited to, printer manufacturer, 3D printer model, 3D printer serial number, hash1 (e.g., SHA-2 hash corresponding to the message request), unique identifiers (UIDs) for the IoT devices and/or cameras, amongst other information. In some embodiments an additional SHA-2 hash of the video pixels in the previous time frame of the video frame (e.g., hash3) and the time into print may also be included in the real-time text file.

The quality control module 150 may continuously sign the real-time text file with the private key of the 3D printer and utilize the signature fingerprint in generating the machine-readable code. The quality control module 150 may continuously sign the real-time text file in pre-determined time increments, such as every second, and/or sign according to different stages of the printing process, such as a number of times for each layer and/or signing anytime the printing material is changed. Accordingly, the real-time text file is signed continuously with the private key of the 3D printer and the signature fingerprint is used to generate the machine-readable code.

The machine-readable code generated as a result of each continuous signing may be unique and tied to the 3D printer serial number, hash1 (e.g., SHA-2 hash corresponding to the message request), the UIDs of the IoT devices and/or cameras, hash3 (e.g., SHA-2 hash of the video pixels in the previous time frame of the video frame), and the time into print, such that a change in any of the information contained in the real-time text file may result in a machine-readable code that does not match the source video. The quality control module 150 may utilize the machine-readable code atop the video footage frame and/or embedded in the metadata as a security measure against attempts to override 3D printing footage and the monitoring of a printing process, qualifying for an unauthorized re-print, manipulating print restrictions, misappropriation of printing materials, amongst other issues that may be prevented.

At 208, the quality control module 150 identifies one or more deviations in the printing process. The quality control module 150 may identify the one or more deviations in the printing process based on the comparison between the 3D print model (e.g., print model) and the digital model (e.g., 3D model) described at step 206 and/or one or more additional validation methods.

As will be explained in more detail below, the quality control module 150 may identify deviations in the printing process using the comparison between the 3D print model and the digital model (e.g., 3D digital model) and/or the one or more additional validation methods. The quality control module 150 may then determine at step 210 whether the identified deviations should be transmitted to the user (e.g., client) in the form of an alert based on the identified deviations and the quality acceptance criteria of the user (e.g., client) which may be specified in the printing preferences of the print job and/or inferred from the information provided in the print job and the data stored in the crowdsourced knowledge corpus (e.g., database 130). The one or more additional validation methods may include, but are not limited to including, photoelectric sensors tests, ultrasonic sound validation tests, quality acceptance evaluations, defect classification assessment, correctability assessments, amongst other validation methods.

The photoelectric sensor tests may be conducted during the print process by the quality control module 150 utilizing a light emitting source below the print bed and the camera and/or other light sensors of the IoT devices positioned above the print bed, see FIG. 3 for a detailed illustration. The light output may be shone through a transparent print bed and the one or more layers of the print and detected by the sensors of the IoT devices which may be utilized by the quality control module 150 in verifying model thickness based on levels of light expected at certain areas of the print based on shape, model thickness, and/or filament material. In the case of light diffuse sensors, the presence of the print within the optical field of view may result in diffused reflections of the beam. Under this method, the quality control module 150 may utilize the light reflected back from the object itself and received by the IoT devices as an indicator of at least expected shape.

The ultrasonic sound validation tests may be conducted during the print process by the quality control module 150 utilizing a short burst of ultrasonic sound emitted from an ultrasonic capable microphone connected to one of the IoT devices. The ultrasonic sound may be reflected back to the IoT devices and captured using the ultrasonic capable microphone. The quality control module 150 may utilize the reflected ultrasonic sound levels in monitoring the print's presence and/or shape.

The quality acceptance evaluations may be conducted during the print process by the quality control module 150 utilizing the printing preferences included in the print job and/or the appropriate quality acceptance criteria of the crowdsourced knowledge corpus (e.g., database 130) such that the defects and/or deviations in the print process may be evaluated against the quality acceptance criteria. The defect classification assessment may be conducted during the print process by the quality control module 150 in classifying different defects and/or deviations as either structural faults or cosmetic faults. For example, structural faults may be defects in which the structural integrity of the print is comprised, and the print may be weak and/or have thinner walls than what might be required for the intended use based on the structural strength requirements. Cosmetic faults may be defects in which the structural integrity of the print is intact but there may be a blemish or unsmoothed bump on the outer walls of the print. The quality control module 150 may utilize the quality acceptance evaluation and defect classification assessment together in evaluating whether the print may still achieve its intended purpose. For example, a cosmetic fault in a jewelry print may be unacceptable under the quality acceptance criteria and require the transmission of an alert to the user (e.g., client) and/or a halt on the printing process. While the same cosmetic fault in a tool print may be acceptable under the quality acceptance criteria and not require an alert and/or interruption in the printing process.

The correctability assessment may be conducted during the print process by the quality control module 150 by understanding the overall printing process and evaluating whether an identified defect and/or deviation may be sufficiently corrected at a later stage of the printing process. The quality control module 150 may perform the correctability assessment based on the process of previous prints which may be stored in the database 130, material being used, amongst other factors. For example, the quality control module 150 may be less likely to continue with the printing process if the material being used for print is gold rather than wood filament.

The quality control module 150 may also identify one or more deviations in the printing process using the machine-readable code atop the video footage frame and/or embedded in the metadata. The quality control module 150 may transmit an alert to an authorized device of the user using one or more messaging services and/or display the alert to the user within the user interface if there is any change in the information contained in the real-time text file which results in a machine-readable code that does not match the source video.

In an embodiment, the quality control process 200 may include a training stage in which deviations in the printing process and/or defects may be identified utilizing at least the methods described above and displayed to the user (e.g., client) in the user interface by the quality control module 150. In the user interface the user (e.g., client) may be able to classify the identified deviations into one of a plurality of categories, the categories may include continue print, continue print and notify user, halt print and notify user, amongst other categories. The quality control module 150 may also utilize other deviations in the printing process previously identified in other printing processes in gathering feedback from the user (e.g., client). The feedback received from the user may be stored in a personal knowledge corpus which may be a separate database specific to the user (e.g., client) stored within database 130. The quality control module 150 may utilize the feedback received from the user (e.g., client) in training one or more machine learning models for decision making on subsequent future prints.

At 210, the quality control module 150 transmits an alert to a user. The quality control module 150 may transmit the alert to the user (e.g., client) based on the one or more deviations in the printing process identified at step 208. The quality control module 150 may also halt the printing process based on the deviations.

The quality control module 150 may transmit the alert to the user (e.g., client) based on a determination that the identified deviations put at risk the quality acceptance criteria of the print job. The quality acceptance criteria of the print job may be automated using the quality acceptance percentage corresponding to a similar print job within the crowdsourced knowledge corpus (e.g., database 130), set by the user (e.g., client) using a specific percentage of quality within the printing preferences, and/or set by the quality control module 150 using a plurality of criteria. The plurality of criteria which may be considered by the quality control module 150 in setting the quality acceptance criteria may include, but is not limited to including, the printing preferences of the user (e.g., client), the printing restrictions included in the print job, acceptability criteria of similar print jobs stored in the crowdsourced knowledge corpus (e.g., database 130), the number of points of risk remaining in the printing process, feedback from the user (e.g., client) stored in the personal knowledge corpus, and/or the correctability assessment performed at step 208. The quality control module 150 may increase the weighting of the feedback received from the user (e.g., client) and/or may rely more heavily on the determination made by the one or more machine learning models as the models are further trained during subsequent prints. The quality acceptance criteria which may be determined using any of the above methods may be a percentage representing a similarity between the digital model (e.g., 3D model) and the 3D print model (e.g., print model), the print model (e.g., 3D print model) being a physical representation generated during the printing process.

The quality control module 150 may transmit the alert to an authorized device of the user using email, text, and/or other messaging services and/or within the user interface displayed by the quality control module 150. The alert may include details relating to the one or more deviations identified, such as images of the deviations, dimensions of the deviations, and/or other details, as well as information about the current status of the printing process, such as, but not limited to, whether the printing process may still be ongoing or whether the printing process may be paused pending feedback from the user (e.g., client).

The user interface may enable the user (e.g., client) to request additional images and/or information. The user interface may also enable the user (e.g., client) to run the one or more additional validation methods described above in at least step 208. For example, the user (e.g., client) may request the quality control module to run a photoelectronic sensor test prior to making a decision regarding the print. In this example, the quality control module 150 may run the photoelectronic sensor test and provide the results of the test, such as model thickness based on levels of light received, to the user (e.g., client). The user (e.g., client) may then determine whether to enable a re-print or continue with the printing process for the current print. The feedback and/or decisions by the user (e.g., client) may then be stored in the personal knowledge corpus and/or used in retraining the one or more machine learning models.

Figure 3:
FIG. 3 depicts an exemplary 3D printing chamber according to at least one embodiment.
Figure 3:
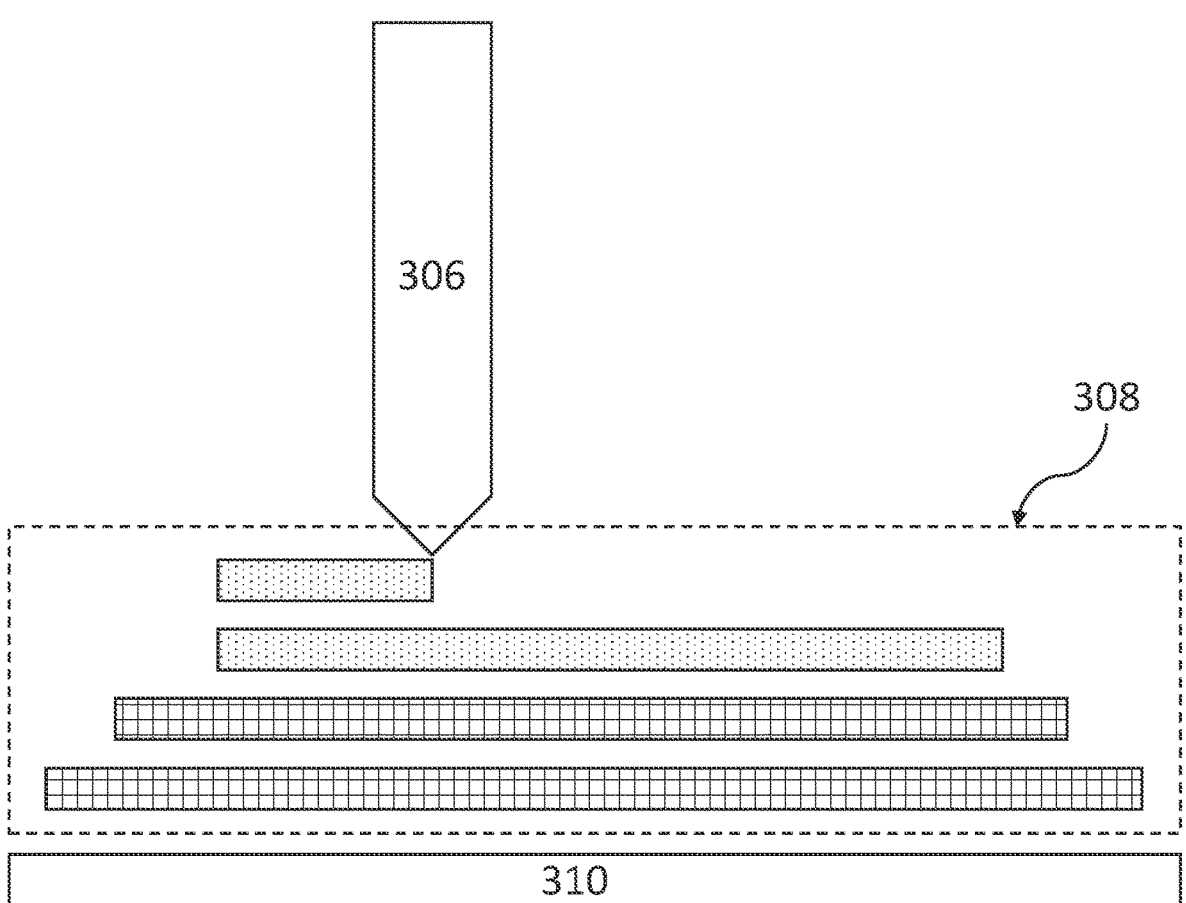

Referring now to FIG. 3, an exemplary 3D printing chamber 300 according to at least one embodiment is depicted. The 3D printing chamber 300 depicted may be utilized by the quality control module 150 in at least monitoring the printing process and/or identifying one or more deviations in the printing process as described above with respect to steps 206 and 208.

In the exemplary 3D printing chamber 300 embodiment, IoT device 302 *a* and IoT device 302 *b* (hereinafter referred to collectively as IoT devices 302) may represent the one or more IoT devices of the 3D printing chamber 300. The IoT devices 302 may be either internal or external to the 3D printing chamber and may be connected to (e.g., equipped with) one or more cameras, light sensors, and/or ultrasonic capable microphones. The one or more light sensors of the IoT devices may be utilized in capturing light received from the Light Emitting Source 304 transmitted through the transparent Print Bed 310 and the Print Layers 308.

The exemplary 3D printing chamber 300 includes four different Print Layers 308. The bottom two layers shown using the large grid pattern represent the use of one material in the print while the top two layers shown using the dotted pattern represent the use of a different material in the print process. Additionally, the 3D printing chamber 300 depicts an ongoing print process in which Print Nozzle 306 is currently printing the top print layer.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for quality control in 3D printing, the method comprising:

receiving a print job for a 3D printer, wherein the print job includes a digital model;

monitoring a printing process of the digital model;

identifying one or more deviations in the printing process;

determining that a quality acceptance criteria is at risk based on the identified one or more deviations; and transmitting an alert to a user.

2. The method of claim 1, wherein the quality acceptance criteria is a percentage of similarity between the digital model and a print model, the print model being a physical representation generated by the printing process.

3. The method of claim 1, wherein the determination that the one or more deviations puts the quality acceptance criteria at risk further comprises:

presenting a user with a plurality of previous deviations previously identified in a user interface;

classifying the plurality of previous deviations based on feedback received from the user within the user interface;

storing the classifications of the plurality of previous deviations in a personal knowledge corpus; and training a machine learning model to determine if a deviation puts the quality acceptance criteria of the user at risk based on the classifications stored in the personal knowledge corpus.

4. The method of claim 1, further comprising:

authenticating the 3D printer based on a plurality of printing restrictions included within the print job, the printing restrictions including a number of total permitted prints for the digital model.

5. The method of claim 4, wherein the authentication of the 3D printer further comprises:

generating a print request message;

signing the print request message using a private key associated with the 3D printer and generating a first hash corresponding to the print message request;

sending the print request message to a 3D model provider and generating a second hash for the print request message received by the 3D model provider, wherein the second hash matches the first hash; and encrypting a file containing the digital model with the second hash using symmetric encryption.

6. The method of claim 5, further comprising:

sending the file containing the digital model to the 3D printer; and decrypting the file containing the digital model using the private key associated with the 3D printer and the first hash.

7. The method of claim 1, wherein the monitoring of the printing process of the digital model further comprises:

receiving video from one or more IoT devices associated with the 3D printer;

generating a print model based on an analysis of the video received from the one or more IoT devices; and comparing the print model with the digital model.

8. The method of claim 7, wherein the identifying of the one or more deviations in the printing process further comprises:

using one or more additional methods in additional to comparing the print model with the digital model, wherein the one or more additional methods include at least a photoelectronic sensor test or a ultrasonic sound validation test using either light sensors or ultrasonic capable microphones associated with the one or more IoT devices.

9. A computer system for quality control in 3D printing, comprising:

one or more processors, one or more computer-readable memories, one or more non-transitory computer-readable storage medium, and program instructions stored on at least one of the one or more non-transitory computer-readable storage medium for execution by at least one of the one or more processors via at least one of the one or more computer-readable memories, wherein the computer system is capable of performing a method comprising:

receiving a print job for a 3D printer, wherein the print job includes a digital model;

monitoring a printing process of the digital model;

identifying one or more deviations in the printing process;

determining that a quality acceptance criteria is at risk based on the identified one or more deviations; and transmitting an alert to a user.

10. The computer system of claim 9, wherein the quality acceptance criteria is a percentage of similarity between the digital model and a print model, the print model being a physical representation generated by the printing process.

11. The computer system of claim 9, wherein the determination that the one or more deviations puts the quality acceptance criteria at risk further comprises:

program instructions, stored on at least one of the one or more computer-readable storage media for execution by at least one of the one or more processors via at least one of the one or more memories, to present a user with a plurality of previous deviations previously identified in a user interface;

program instructions, stored on at least one of the one or more computer-readable storage media for execution by at least one of the one or more processors via at least one of the one or more memories, to classify the plurality of previous deviations based on feedback received from the user within the user interface;

program instructions, stored on at least one of the one or more computer-readable storage media for execution by at least one of the one or more processors via at least one of the one or more memories, to store the classifications of the plurality of previous deviations in a personal knowledge corpus; and program instructions, stored on at least one of the one or more computer-readable storage media for execution by at least one of the one or more processors via at least one of the one or more memories, to train a machine learning model to determine if a deviation puts the quality acceptance criteria of the user at risk based on the classifications stored in the personal knowledge corpus.

12. The computer system of claim 9, further comprising:

program instructions, stored on at least one of the one or more computer-readable storage media for execution by at least one of the one or more processors via at least one of the one or more memories, to authenticate the 3D printer based on printing restrictions included within the print job, the print restrictions including a number of total permitted prints for the digital model.

13. The computer system of claim 12, wherein the authenticating of the 3D printer further comprises:

program instructions, stored on at least one of the one or more computer-readable storage media for execution by at least one of the one or more processors via at least one of the one or more memories, to generate a print request message;

program instructions, stored on at least one of the one or more computer-readable storage media for execution by at least one of the one or more processors via at least one of the one or more memories, to sign the print request message using a private key associated with the 3D printer and generating a first hash corresponding to the print message request;

program instructions, stored on at least one of the one or more computer-readable storage media for execution by at least one of the one or more processors via at least one of the one or more memories, to send the print request message to a 3D model provider and generating a second hash for the print request message received by the 3D model provider, wherein the second hash matches the first hash; and program instructions, stored on at least one of the one or more computer-readable storage media for execution by at least one of the one or more processors via at least one of the one or more memories, to encrypt a file containing the digital model with the second hash using symmetric encryption.

14. The computer system of claim 13, further comprising:

program instructions, stored on at least one of the one or more computer-readable storage media for execution by at least one of the one or more processors via at least one of the one or more memories, to send the file containing the digital model to the 3D printer; and program instructions, stored on at least one of the one or more computer-readable storage media for execution by at least one of the one or more processors via at least one of the one or more memories, to decrypt the file containing the digital model using the private key associated with the 3D printer and the first hash.

15. A computer program product for quality control in 3D printing, comprising:

one or more computer readable storage media, and program instructions collectively stored on the one or more computer readable storage media, the program instructions comprising:

receiving a print job for a 3D printer, wherein the print job includes a digital model;

monitoring a printing process of the digital model;

identifying one or more deviations in the printing process;

determining that a quality acceptance criteria is at risk based on the identified one or more deviations; and transmitting an alert to a user.

16. The computer program product of claim 15, wherein the quality acceptance criteria is a percentage of similarity between the digital model and a print model, the print model being a physical representation generated by the printing process.

17. The computer program product of claim 15, wherein the determination that the one or more deviations puts the quality acceptance criteria at risk further comprises:

program instructions, stored on at least one of the one or more computer-readable storage media, to present a user with a plurality of previous deviations previously identified in a user interface;

program instructions, stored on at least one of the one or more computer-readable storage media, to classify the plurality of previous deviations based on feedback received from the user within the user interface;

program instructions, stored on at least one of the one or more computer-readable storage media, to store the classifications of the plurality of previous deviations in a personal knowledge corpus; and program instructions, stored on at least one of the one or more computer-readable storage media, to train a machine learning model to determine if a deviation puts the quality acceptance criteria of the user at risk based on the classifications stored in the personal knowledge corpus.

18. The method of claim 1, wherein the determination that the one or more deviations puts the quality acceptance criteria at risk further comprises:

classifying a plurality of previous deviations based on feedback received from a user within a user interface, wherein the classifications are stored in a person knowledge corpus.

19. The method of claim 18, further comprising:

training a machine learning model to determine if a deviation puts the quality acceptance criteria of the user at risk based on the classifications.

20. The method of claim 1, further comprising:

training a machine learning model to determine if a deviation puts the quality acceptance criteria of a user at risk, wherein the machine learning model is trained on classifications of a plurality of previous deviations based on feedback received from the user within a user interface.

* * * * *